(12) United States Patent
Hull et al.

(10) Patent No.: US 7,381,891 B2
(45) Date of Patent: *Jun. 3, 2008

(54) ELECTRICAL BOX SUPPORT

(75) Inventors: Eric G. Hull, Madison, OH (US); Charles H. Riedy, Lakewood, OH (US); Robert M. Gudin, Willoughby, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/216,339

(22) Filed: Aug. 31, 2005

(65) Prior Publication Data

US 2005/0284650 A1 Dec. 29, 2005

Related U.S. Application Data

(63) Continuation-in-part of application No. 10/680,795, filed on Oct. 7, 2003.

(51) Int. Cl.
*H01H 9/02* (2006.01)
(52) U.S. Cl. .............. 174/58; 174/50; 174/57; 220/3.2; 220/3.3; 248/906
(58) Field of Classification Search .......... 174/50, 174/48, 53, 54, 58, 61, 63, 17 R, 480, 481; 220/3.2, 3.3, 3.4, 3.5, 3.6, 3.7, 3.8, 3.9, 4.02; 248/560, 200, 903, 906, 343; 439/535, 536, 439/538
See application file for complete search history.

(56) References Cited

U.S. PATENT DOCUMENTS

| | | | |
|---|---|---|---|
| 1,066,706 A | * | 7/1913 | Caine .................. 248/906 |
| 1,168,889 A | * | 1/1916 | Knauber ............... 248/906 |
| 1,453,017 A | | 4/1923 | Lindelof |
| 1,592,990 A | | 7/1926 | Raquette et al. |
| 1,898,282 A | | 2/1933 | Almcrantz |
| 2,681,164 A | | 6/1954 | Zoltan |
| 2,770,436 A | * | 11/1956 | Linhardt, Jr. .......... 248/906 |

(Continued)

FOREIGN PATENT DOCUMENTS

DE   3423284 A1   6/1984

(Continued)

OTHER PUBLICATIONS

Contractor's box pictures.

*Primary Examiner*—Angel R. Estrada
(74) *Attorney, Agent, or Firm*—Jones Day

(57) ABSTRACT

An electrical box having spring legs for supporting the box within a space between a pair of spaced-apart parallel concrete forms. The legs engage the inside surface of one form and bias the open end of the box against the inside surface of the other form. The legs and the bottom of the box are cooperatively configured to facilitate attachment of the legs to the box. A bendable strap is attached to the box for wrapping around reinforcing bars within the forms. The legs and strap hold the box in position when concrete is poured into the space between the forms. The entire box and support elements remain embedded within the finished concrete wall, and with the open end of the box exposed at an outer surface of the concrete wall.

33 Claims, 16 Drawing Sheets

U.S. PATENT DOCUMENTS

| | | | |
|---|---|---|---|
| 3,730,466 A | | 5/1973 | Swanquist |
| 3,977,640 A | | 8/1976 | Arnold et al. |
| 4,747,506 A | | 5/1988 | Stuchlik, III |
| 4,934,644 A | | 6/1990 | Nagy et al. |
| 4,943,022 A | | 7/1990 | Rinderer |
| 4,978,092 A | * | 12/1990 | Nattel ........................ 220/3.7 |
| 5,239,132 A | | 8/1993 | Bartow |
| 5,408,045 A | | 4/1995 | Jorgensen et al. |
| 6,491,270 B1 | | 12/2002 | Pfaller |
| 6,648,277 B2 | | 11/2003 | De Leu |

FOREIGN PATENT DOCUMENTS

| | | | |
|---|---|---|---|
| JP | 401256662 A | | 10/1989 |
| JP | 05003616 A | * | 1/1993 |
| JP | 5146029 | | 6/1993 |
| JP | 05276632 A | * | 10/1993 |
| JP | 8338130 | | 12/1996 |

* cited by examiner

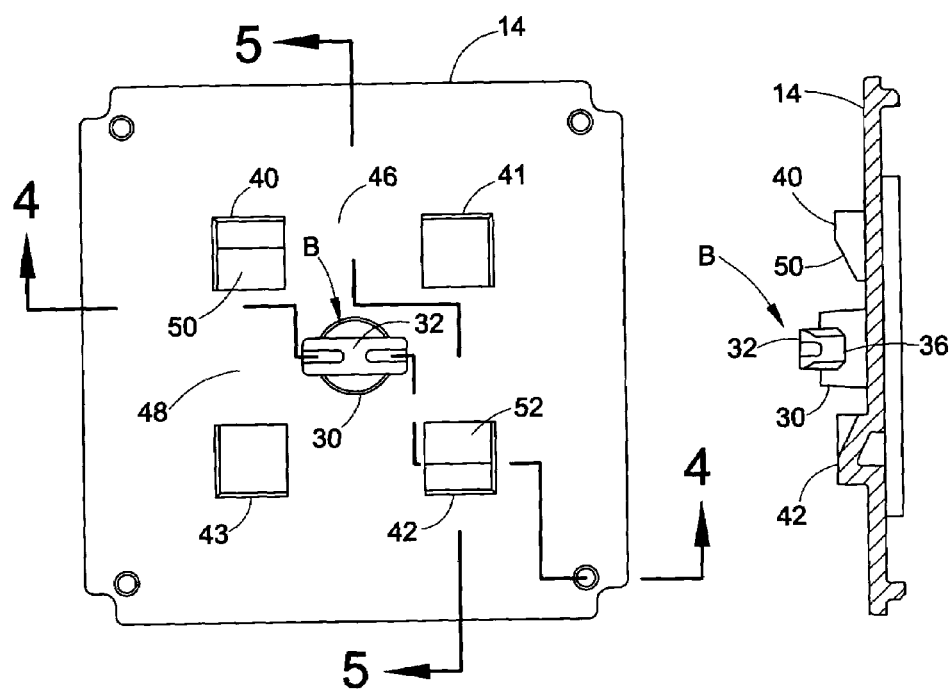
FIG. 3
FIG. 5
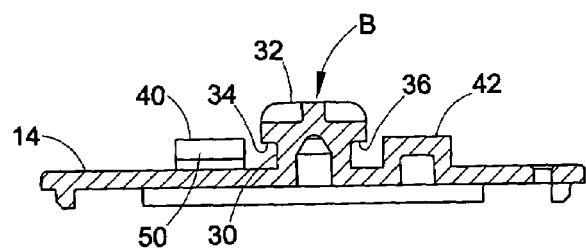
FIG. 4

ELECTRICAL BOX SUPPORT

REFERENCE TO RELATED APPLICATION

This application is a continuation-in-part of U.S. Ser. No. 10/680,795 filed Oct. 7, 2003.

BACKGROUND OF THE INVENTION

This application relates to the art of electrical boxes and, more particularly, to supports for electrical boxes. The invention is particularly applicable to electrical boxes that are known as mud boxes or slab boxes used in poured concrete construction and will be specifically described with reference thereto. However, it will be appreciated that the invention has broader aspects, and that certain features of the invention may be used in other environments and for other purposes.

Electrical mud or slab boxes commonly are supported within a space between a pair of spaced-apart parallel concrete forms. The box is suitably supported in the space between the forms with the box open end in engagement with an inside surface of one of the forms. The space between the forms is filled with concrete and the forms are removed after the concrete has cured. The open end of the box then is accessible on an external surface of the concrete wall.

It is difficult to support the box in the space between the forms in a manner that prevents any movement of the box while the concrete is being poured. It would be desirable to have a support arrangement for the box that is easy to install while providing minimal possibility of box displacement during pouring of the concrete.

SUMMARY OF THE INVENTION

An electrical mud box of the type described is provided with a mounting apparatus for positioning the open front of the box closely adjacent to or in engagement with a surface of a concrete form against which concrete is poured.

The mounting apparatus may take the form of a pair of elongated bendable straps that are positioned in parallel overlying relationship. A central opening through the straps receives a projection on the backwall of the box to attach the straps to the box.

The pair of straps are attached together adjacent the opening therein, and each strap has a pair of bendable strap portions extending outwardly from the box for attachment to reinforcing bars or for positioning against a concrete form surface to hold the box against or close to an opposite concrete form surface.

In one arrangement, the pair of straps is stamped from a single piece of metal which is then folded over to position the two straps in overlying relationship.

The mounting apparatus may include spring legs that engage the inside surface of one form to bias the open end of the box against the inside surface of the opposite form. A bendable strap attached to the box can be wrapped around reinforcing bars within the space between the forms to further secure the box against displacement.

In one arrangement the spring legs are on generally U-shaped spring members that are secured to the box bottom wall. Two of the spring members provide four spring legs that firmly and uniformly bias the open end of the box against the inside surface of a concrete form.

In one arrangement, the box bottom wall has a central external projection to which the spring leg members are attachable. Configuration of the box bottom wall and the spring leg members with cooperating attaching arrangements enables easy assembly of the spring leg members to the box in the field.

The attaching arrangement for the spring leg members or straps may comprise a double keyhole slot formed by a central cylindrical hole having rectangular slots extending outwardly therefrom in opposite directions. A projection on the box bottom wall has a corresponding shape for reception in the double keyhole slot. The projection is undercut so that a spring member or strap is rotatable 90° to lock a spring member or strap to the box by way of the box projection overlying a spring leg member or strap outwardly of the cylindrical attachment hole intermediate the attachment slots.

It is a principal object of the present invention to provide an improved arrangement for supporting an electrical box.

It is another object of the invention to provide an improved support arrangement for supporting an electrical mud box within concrete forms.

It is a further object of the invention to provide a mud box support arrangement that is automatically adjustable to support the box between a wide variety of concrete form spacings.

It is an additional object of the invention to provide an improved mud box support that is easily installed in the field.

BRIEF DESCRIPTION OF THE DRAWING

FIG. 3 is a plan view of the box bottom wall of FIG. 2;

FIG. 4 is a cross-sectional elevational view taken generally on line 4-4 of FIG. 3;

FIG. 5 is a partial cross-sectional elevational view taken generally on line 5-5 of FIG. 3;

DESCRIPTION OF A PREFERRED EMBODIMENT

Figure 1:
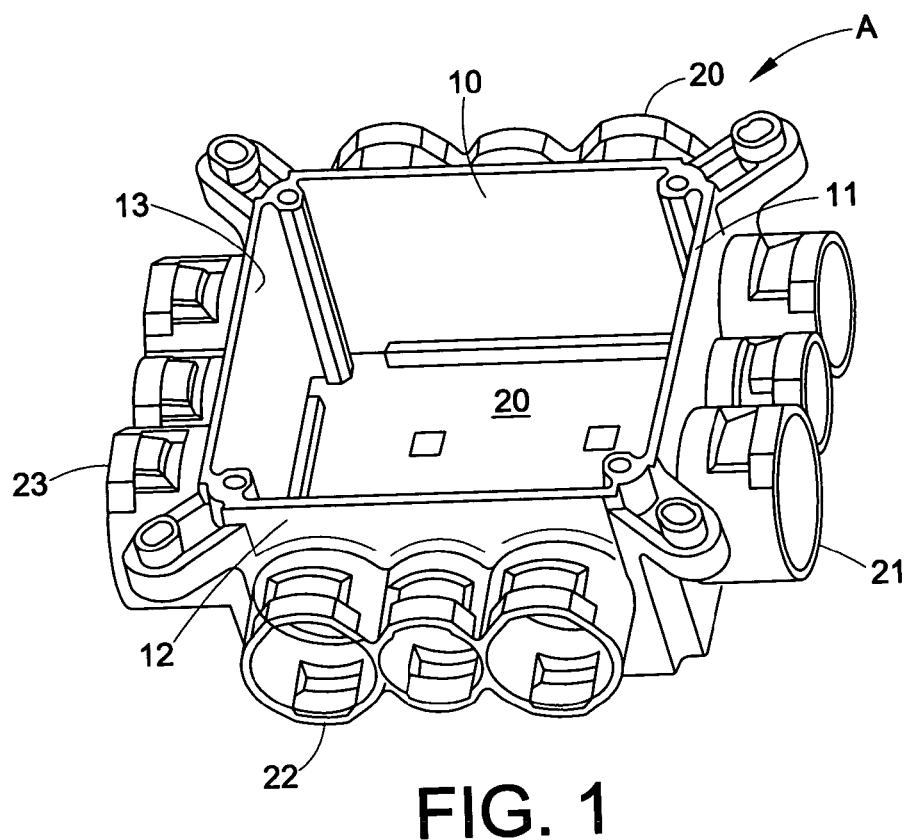
FIG. 1 is a perspective illustration of a mud box in accordance with the present application.
Figure 2:
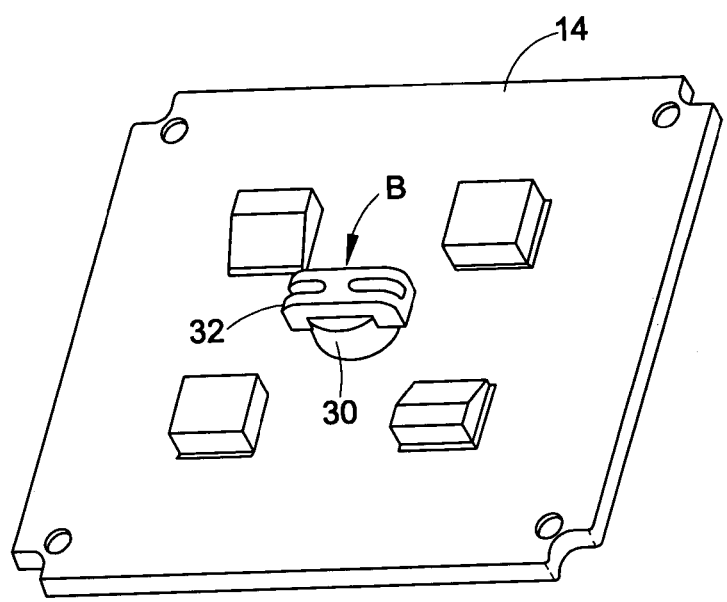
FIG. 2 is a perspective illustration of a bottom wall for the box of FIG. 1.
Figure 7:
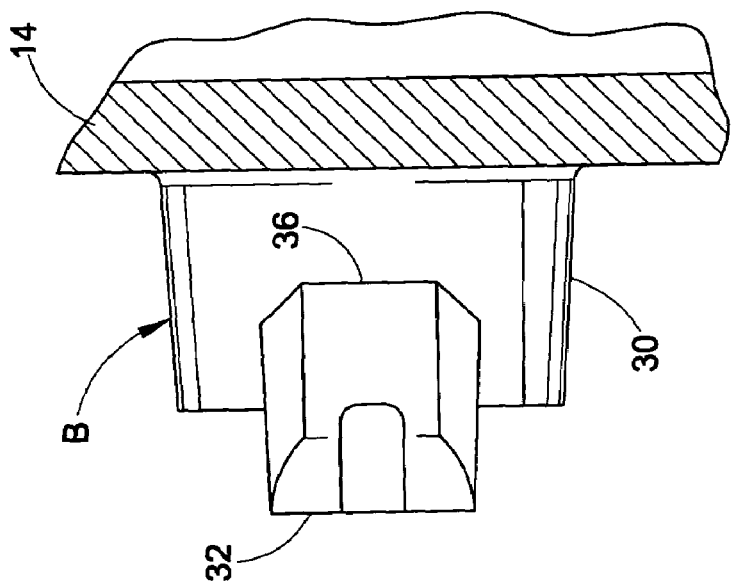
FIG. 7 is a side elevational view of the projection of FIG. 6.
Figure 6:
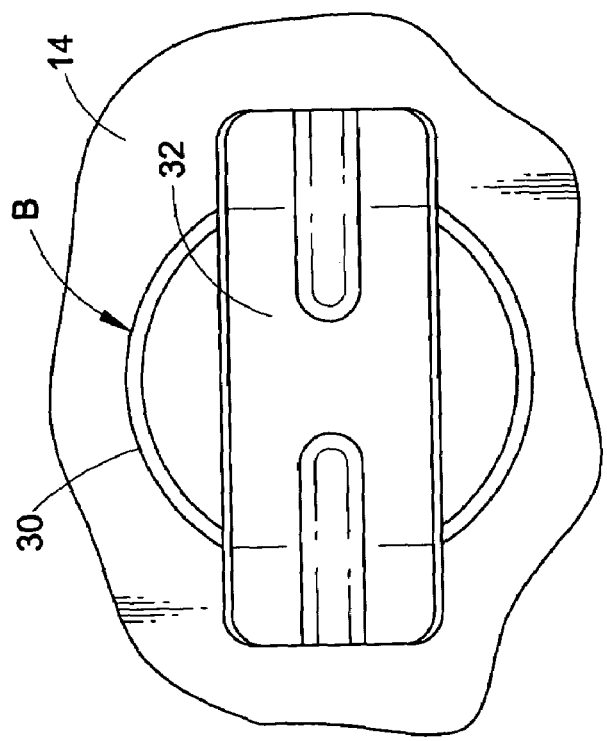
FIG. 6 is an enlarged plan view of an attachment projection on the box bottom wall.

Referring now to the drawing, wherein the showings are for purposes of illustrating a preferred embodiment of the invention only and not for purposes of limiting same, FIG. 1 shows a mud box A molded of plastic material with side walls 10, 11, 12 and 13 and a bottom wall 14. The end of the box opposite from bottom wall 14 is an open end as shown in FIG. 1. Connectors 20, 21, 22 and 23 are provided on the box side walls for attaching conduit, tubing or fittings thereto. Suitable openings or knockouts that are not shown are provided in box walls 10-13 in alignment with connectors 20-23.

As shown in FIGS. 2-5, flat and rectangular box bottom wall 14 includes a centrally located attachment projection B having a central cylindrical projection 30 extending upwardly from the outer surface of bottom wall 14. A transverse projection member 32 on the outer end of cylindrical portion 30 extends outwardly beyond cylindrical portion 30 in opposite directions to provide a generally T-shaped configuration as best shown in FIG. 4. Transverse projection 32 provides downwardly facing shoulders 34, 36 that are spaced above and face toward the outer surface of bottom wall 14. Transverse projection 32 has a width that is much smaller than the diameter of cylindrical-portion 30 as shown in FIG. 3.

Abutments 40, 41, 42 and 43 extend upwardly from the outer surface of bottom wall 14 and are equidistantly spaced from one another outwardly of projection B. In effect, abutments 40-43 lie at the corners of a rectangle. Abutments 40, 41 and 42, 43 define a guideway therebetween that extends from top to bottom in FIG. 3 with projection B at the center of the guideway. Projections 40, 43 and 41, 42 define a second guideway therebetween extending from left-to-right in FIG. 3 with projection B at the center of the guideway. The two guideways extend perpendicular to one another. One guideway is generally indicated by number 46 in FIG. 3 and the other guideway is generally indicated by number 48. Transverse projection 32 extends generally parallel to guideway 48 and perpendicular to guideway 46. Abutments 40 and 42 have sloping cam surfaces 50 and 52 that slope downwardly toward guideway 48. Cam surfaces 50, 52 also slope downwardly toward the outer surface of bottom wall 14 in a direction generally perpendicular to the longitudinal axis of transverse attachment projection 32.

Figure 8:
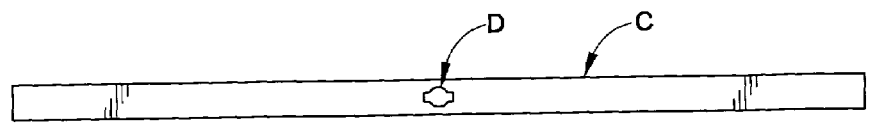
FIG. 8 is a plan view of a locking strap.
Figure 9:
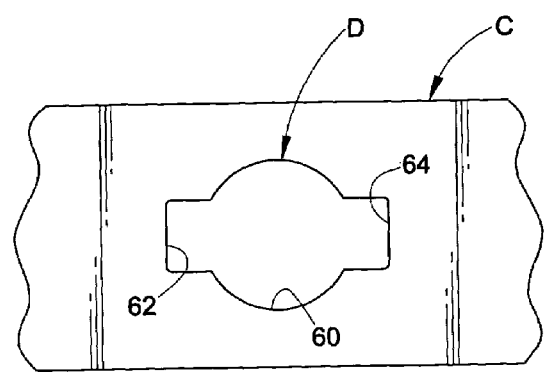
FIG. 9 is an enlarged plan view of an attachment opening on the strap of FIG. 8.

FIGS. 8 and 9 show an elongated flat bendable metal strap C having a centrally located attachment opening D therein. Attachment opening D may be considered to have a double keyhole configuration with a central cylindrical portion 60, and rectangular slots 62 and 64 extending outwardly therefrom in opposite directions. As shown in FIG. 9, the diameter of circular portion 60 is greater than the width of rectangular slots 60, 62 as measured in a direction perpendicular to the longitudinal axis of strap C.

Figure 10:
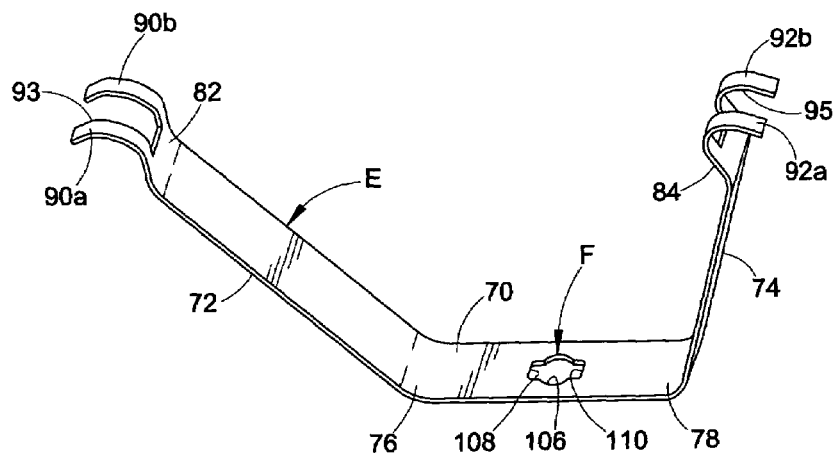
FIG. 10 is a perspective illustration of a spring leg member.
Figure 11:
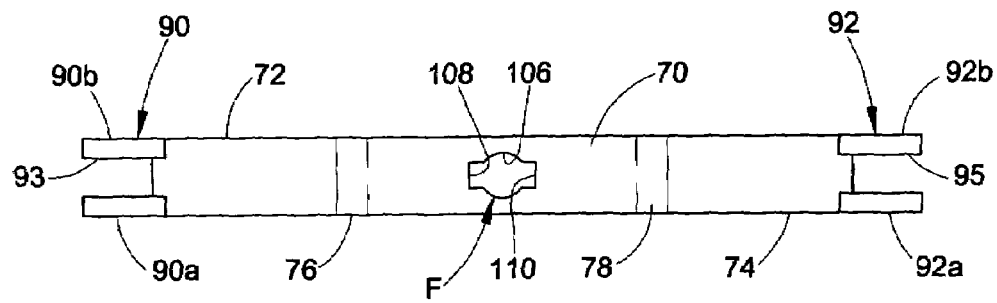
FIG. 11 is a top plan view of the spring leg member of FIG. 10.
Figure 12:
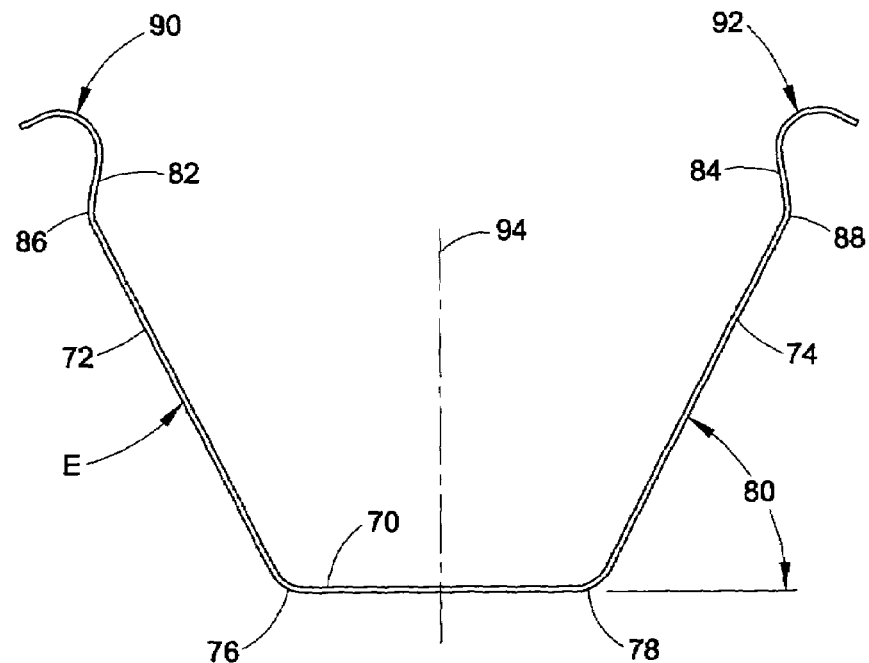
FIG. 12 is a side elevational view of the spring leg member of FIGS. 10 and 11.

FIGS. 10-12 show a generally U-shaped spring leg member E having a flat central attachment portion 70 and opposite spring legs 72, 74 connected with flat attachment portion 70 by curved portions 76, 78. As shown in FIG. 12 for spring leg 74, each spring leg 72, 74 is inclined to the horizontal at an angle 80 at about 64°. Angle 80 may range from about 45° to about 75°, but around 64° has been found to be preferable.

Flat attachment portion 70 extends approximately across the entire width of bottom wall 14, and begins curving upwardly and outwardly at curved portions 76, 78 adjacent the intersection of the bottom wall with a sidewall.

Each spring leg 72, 74 has a spring leg end portion 82, 84 bent inwardly toward one another as at 86 and 88, are reversely curved as indicated at 90, 92 to extend back toward flat attachment portion 70. Thus, legs 72 and 74 are inclined outwardly away from a longitudinal axis 94 in FIG. 12 that extends perpendicular to attachment portion 30 while end portions 82 and 84 are inclined back inwardly toward such axis. In the relaxed position of a spring leg member, end portions 90, 92 may be spaced-apart around 10½ inches whereas box A measures only 4 inches on a side. Therefore, the leg end portions extend outwardly well beyond the box sides. The dimension of a spring leg member from attachment portion 70 to a reversely curved end portion 90 along an axis perpendicular to attachment portion 70 may be around 6¼ inches so that the spring legs extend well rearwardly of box A.

Reversely curved spring leg portions 90, 92 are longitudinally centrally notched as at 93, 95 to divide the end portions into a pair of spaced-apart relatively narrow reversely curved support end portions 90a, 90b and 92a, 92b. Thus, the leg end portions are bifurcated or forked. The width of each reversely curved support end portion 90a, 90b, 92a and 92b is less than one-third of the width of a spring leg 72, 74, and preferably close to around one-fourth of the width of a leg 72, 74. The width of notch 93, 95 then would be around one-third to one-half the width of a spring leg 72, 74.

Each reversely curved support end portion 90a, 90b, 92a or 92b preferably has a width that is not greater than the space between a pair of such support end portions on one spring leg. The curvature of a support end portion is provided so that a curved surface engages the inner surface of the concrete form rather than a terminal end of a spring leg. This shaping and bifurcating of the spring leg end portions significantly reduces the area or footprint of a spring leg end portion that is exposed at the surface of a finished concrete wall.

Spring leg member E preferably is formed of tempered spring steel although it will be appreciated that other materials including plastics may be used for certain purposes. In a most preferred arrangement, spring leg member E is made of spring temper stainless steel so that no rust will bleed from a spring leg at a surface of a concrete wall where an end portion 90 or 92 of a spring leg is exposed. When stainless steel is not used, the reversely curved end portions of the spring legs may be coated with a rubberized or plastisol coating if so desired to prevent rust bleed through.

Attachment portion 70 of spring leg member E has a centrally located attachment opening F that corresponds in size and shape to attachment opening D in strap C. Thus, attachment opening F may be considered to have a double keyhole configuration with a central cylindrical portion 106 having centrally located rectangular slots 108 and 110 extending outwardly therefrom in opposite directions. The width of rectangular slots 108 and 110 is much smaller than diameter of central cylindrical portion 106. In the arrangement shown and described, bottom wall 14 is a separate member that is attached to the remainder of the box with screws or other suitable fasteners. However, it will be appreciated that the wall of the box could be integrally formed with the remainder thereof.

Figure 13:
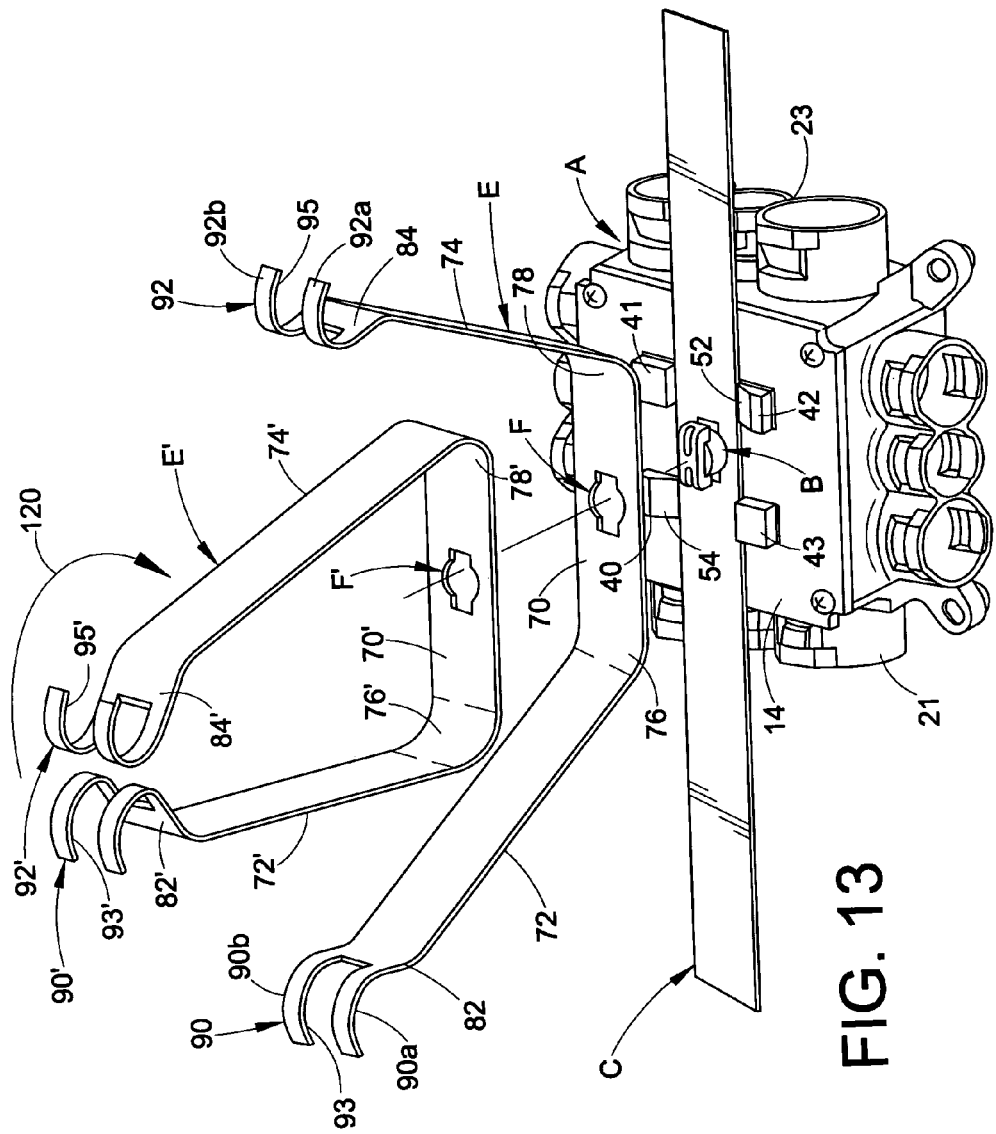
FIG. 13 is a perspective illustration showing how the support legs of the present application are attached to a mud box.

Attachment openings D in strap C and F in spring leg opening E are sized and shaped for close reception of box attachment projection B therethrough. The box support arrangement is attached to a box as shown in FIG. 13. Attachment projection B is extended through the attachment opening D in a flat strap C, and with strap C closely received in the left-to-right guideway that is formed between abutments 40, 43 and 41, 42. The abutments then prevent rotation of strap C relative to box A. Next, a spring leg member E is positioned with attachment projection B extending through attachment opening F. Flat attachment portion 70 and parts of curved portion 76, 78 are then received in the left-to-right guideway between abutments 40, 43 and 41, 42 on top of strap C. Next, another spring leg member E' is positioned with attachment projection B extending through attachment opening F'. The thickness of strap C, attachment portion 70 and attachment portion 70' is such that all three are received in the space between the outer surface of bottom wall 14 and shoulders 34, 36 on attachment projection B in FIG. 4.

Spring leg members 72', 74' are bent toward one another to the configuration shown in FIG. 13 and spring leg member E' is rotated clockwise as indicated by arrow 120. Although a generally flat configuration is shown for attaching portion 70' in FIG. 13, it will be recognized that attaching portion 70' actually assumes a shallow generally U-shaped curvature when legs 72', 74' are bent toward one another. Attachment portion 70' then engages cam surfaces 52, 54 on abutments 40, 42 for permitting clockwise rotation of spring leg member E' 90° until attachment portion 70' is received within the top-to-bottom guideway between abutments 40, 41 and 42, 43. The spring leg member E' then is released, and abutments 40-43 prevent rotation of all three members C, E and E'.

Figure 14:
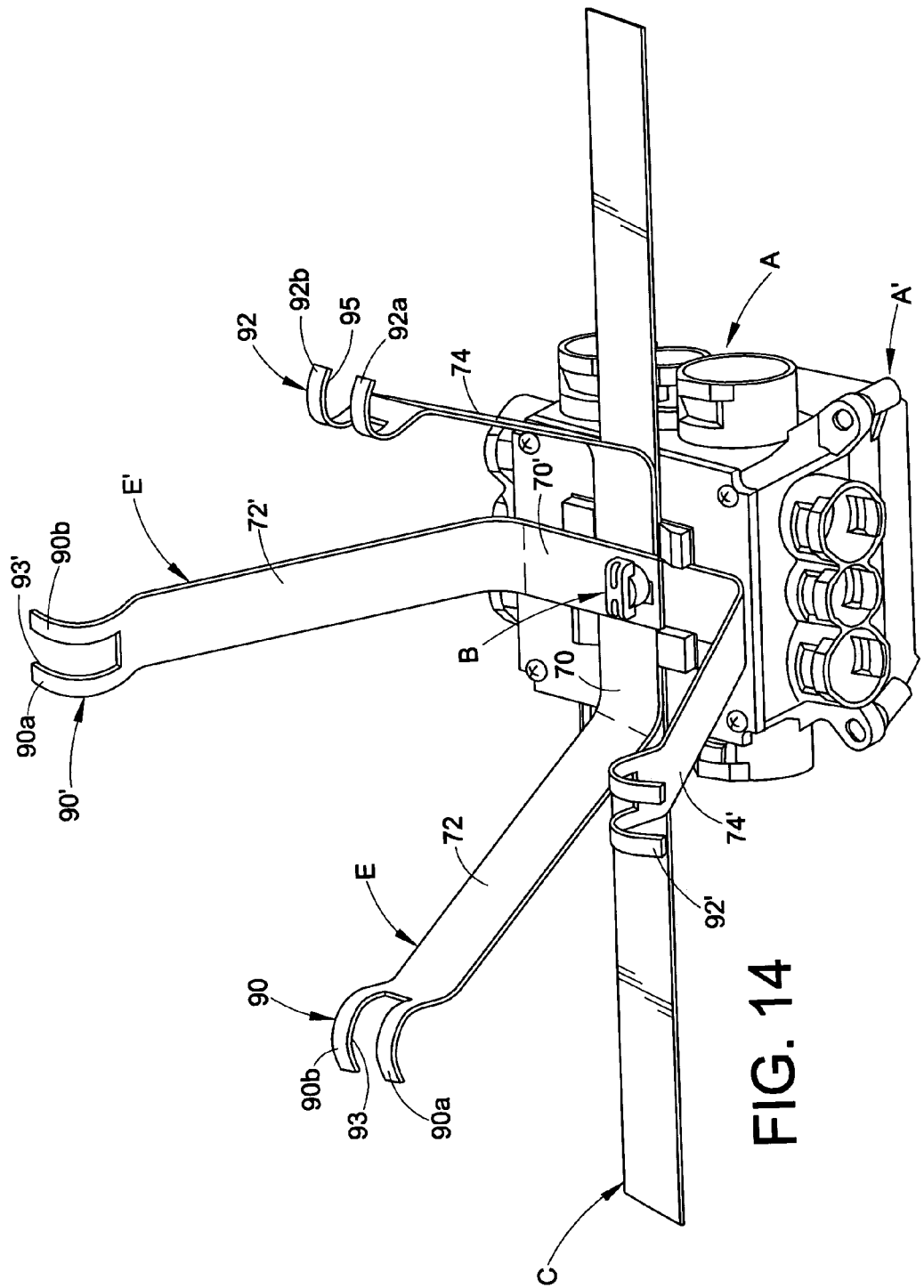
FIG. 14 is a perspective illustration showing a mud box having the support arrangement of the present application attached thereto.
Figure 15:
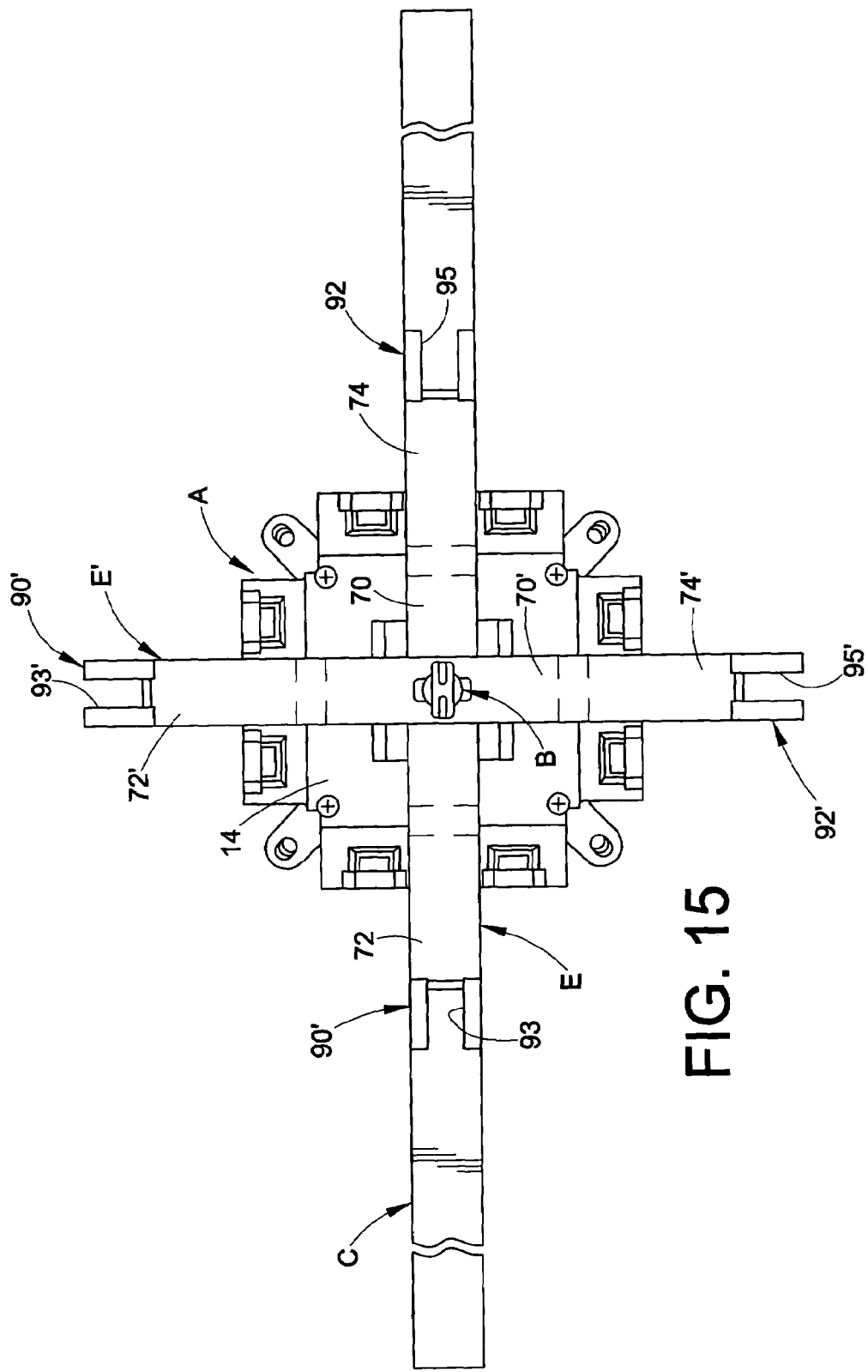
FIG. 15 is a plan view of a mud box having the support arrangement of the present application attached thereto.

When spring leg member E' is rotated 90° clockwise, attachment projection shoulders 34, 36 of FIG. 4 extend outwardly beyond cylindrical hole 60' at locations midway between opposite slots 108', 110' to prevent removal of spring leg member E' from attachment projection B. This also holds strap C and spring leg member E on the box. The final assembly is illustrated in FIGS. 14 and 15.

Configuring attachment projection with a relatively large diameter cylindrical portion 30 provides very high strength and minimizes the possibility that the attachment projection will be broken off from the box bottom wall. At the same time, minimizing the width of transverse projection 32 enables the use of smaller rectangular openings for attachment openings D and F in strap C and spring leg member E so that the central attachment portion of the strap or spring leg member is not unduly weakened by the attachment opening.

Although the spring legs could be attached to the box in other ways and in other locations, the central attachment location insures that substantially uniform pressure will be applied for holding the periphery of the box open end against the inside surface of a concrete form.

Figure 16:
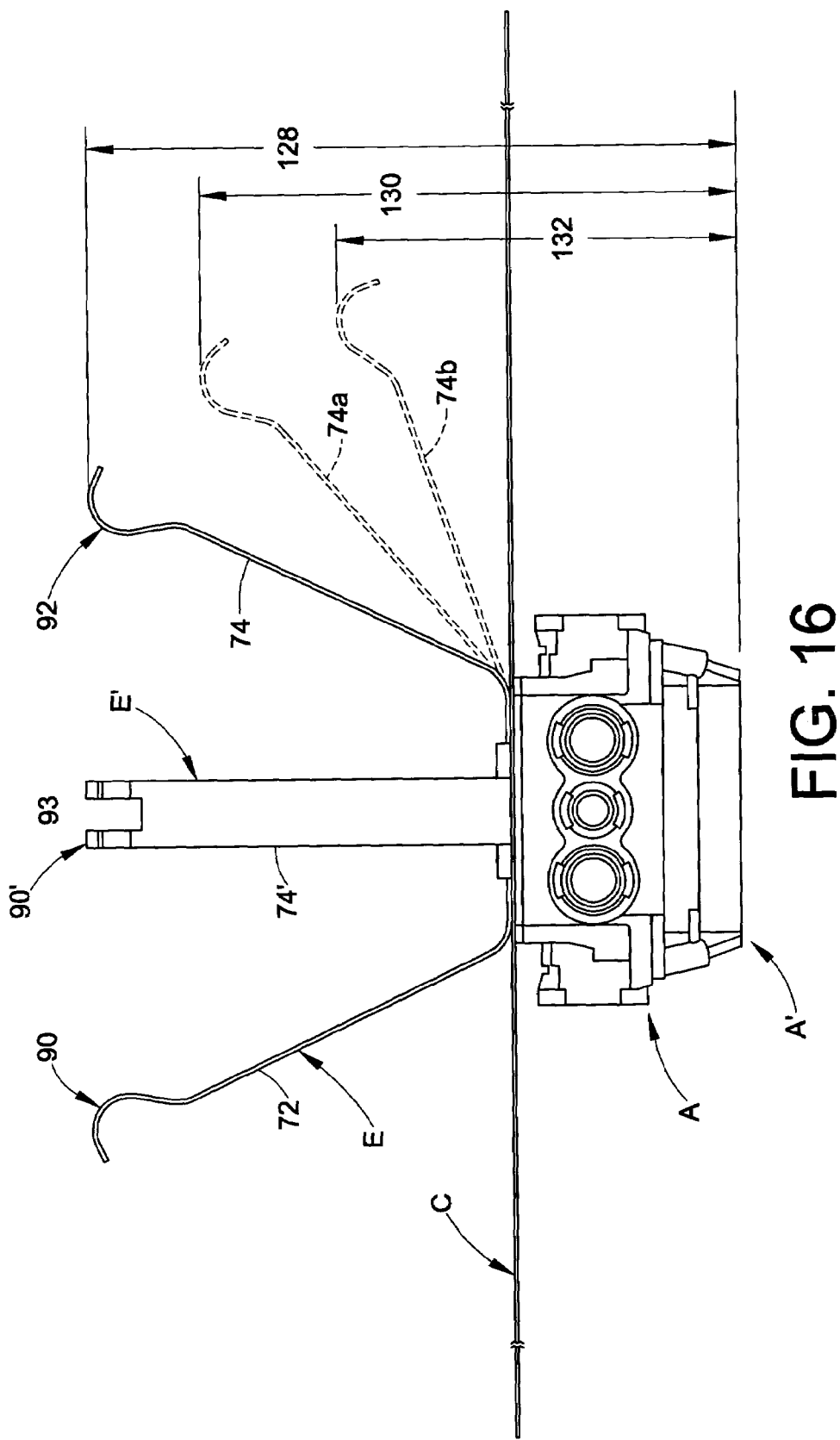
FIG. 16 is a side elevational view of a mud box having the support arrangement of the present application attached thereto and showing the working range of the spring legs.

FIG. 16 shows a typical working range for the spring legs by illustrating leg 74 in dotted line positions 74a and 74b. From the open end of an adapter A' on box A to the reversely curved end 92 of leg 74, the free length 128 is 9½ inches. The length 130 is 8 inches and the length 132 is 6 inches. Thus, the support arrangement may be used for supporting a box between concrete forms having form inner surfaces that are spaced anywhere from about 6 inches to about 8 inches. Obviously, the spring leg members may be made in other sizes, shapes and stiffnesses for supporting boxes in much wider range of spaces.

Figure 17:
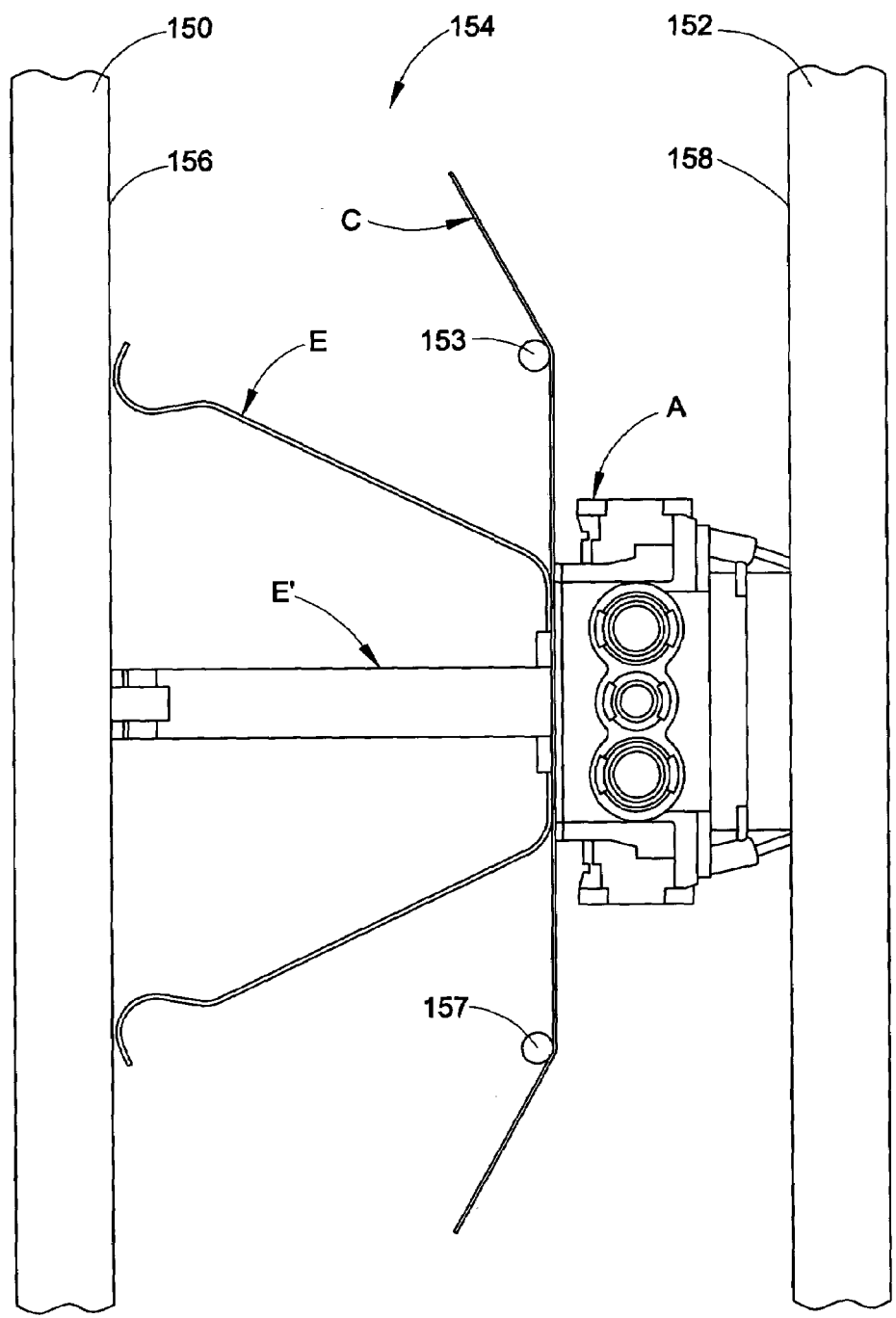
FIG. 17 is a side elevational view showing a mud box in accordance with the present application supported between a pair of spaced-apart parallel concrete forms.

FIG. 17 shows a pair of spaced-apart parallel concrete forms 150, 152 having a space 154 therebetween and form inner surfaces 156, 158. A box and support assembly are positioned within space 154 with the open end of box A engaging inner form surface 158 and with the end portions of the four legs on spring members E, E' engaging form inner surface 156 for biasing the box open end against form inner surface 158. Strap C may be bent around reinforcing bars 153, 157 that typically are provided within space 154 to further prevent any movement of box A from its desired position. After space 154 has been filled with concrete that is allowed to cure, forms 150, 152 are stripped away, and the box and its support assembly remain within the concrete wall. The open end of the box is exposed at an outer surface of the concrete wall.

Figure 18:
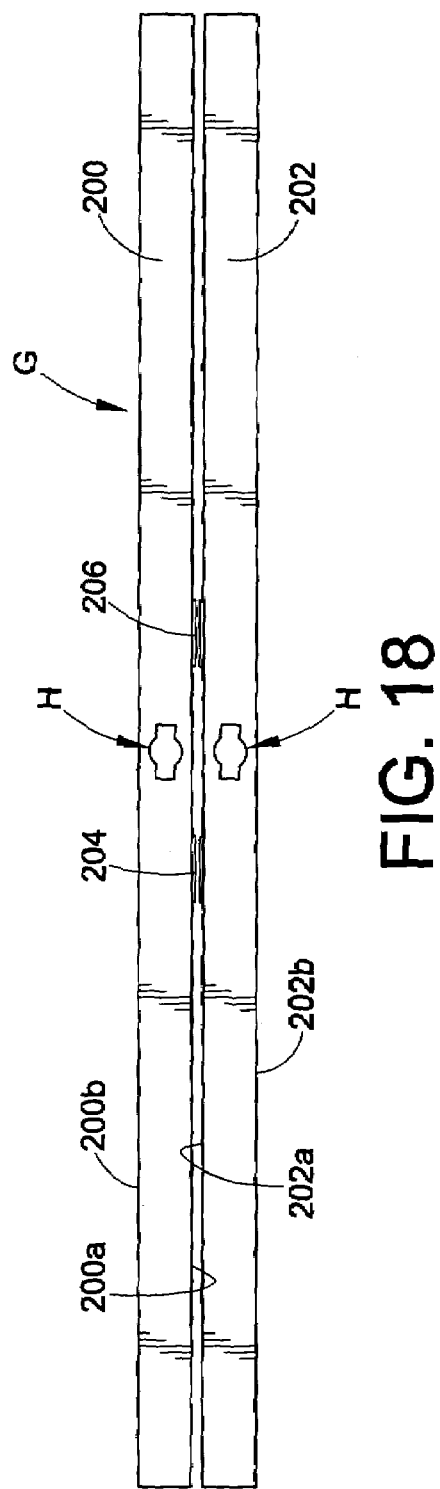
FIG. 18 is a plan view of a strap member blank.

FIG. 18 shows a sheet metal blank G that has been stamped to form two elongated bendable straps 200, 202, each having a generally central opening H corresponding in size and shape to opening F in FIG. 11.

Straps 200, 202 are integrally connected by spaced-apart webs 204, 206 located adjacent to, but spaced outwardly from, openings H. Each strap 200, 202 has opposite sides 200a, 200b, 202a, 202b, and webs 204, 206 interconnect adjacent sides 200a, 202a.

Figure 19:
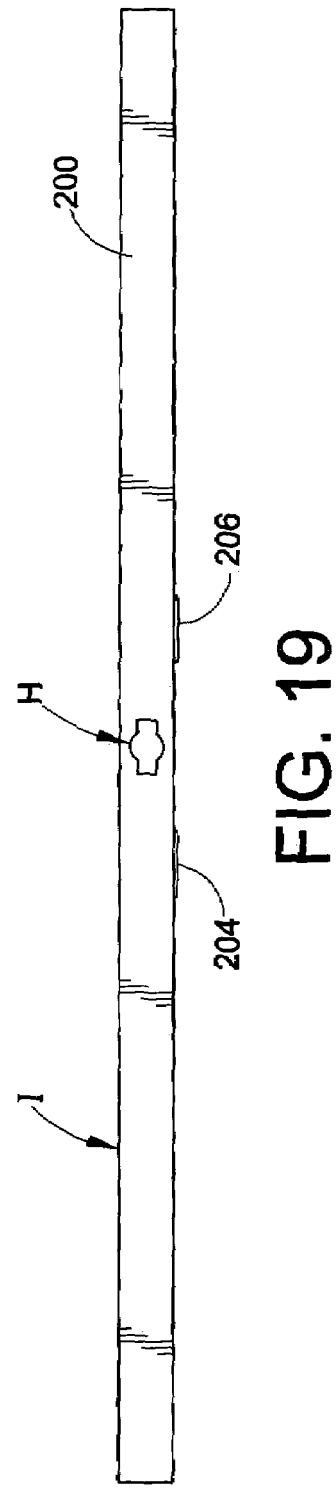
FIG. 19 is a plan view of the blank of FIG. 18 after it has been folded over to place the pair of straps in overlyng relationship.

Straps 200, 202 are folded into overlying parallel relationship on top of one another by folding webs 204, 206 to provide a strap member I in FIG. 19. When blank G is stamped, a burr is left on the underside peripheral edges. The blank G is folded so that the burrs face each other. Thus, the burrs are on the edges of the facing surfaces of straps 200, 202 in strap member I.

Obviously, a plurality of more than two straps can be provided, and individual straps can be connected after stamping instead of being formed integrally. Multiple straps also can be arranged in other than parallel relationship, and may be connected or unconnected.

Figure 20:
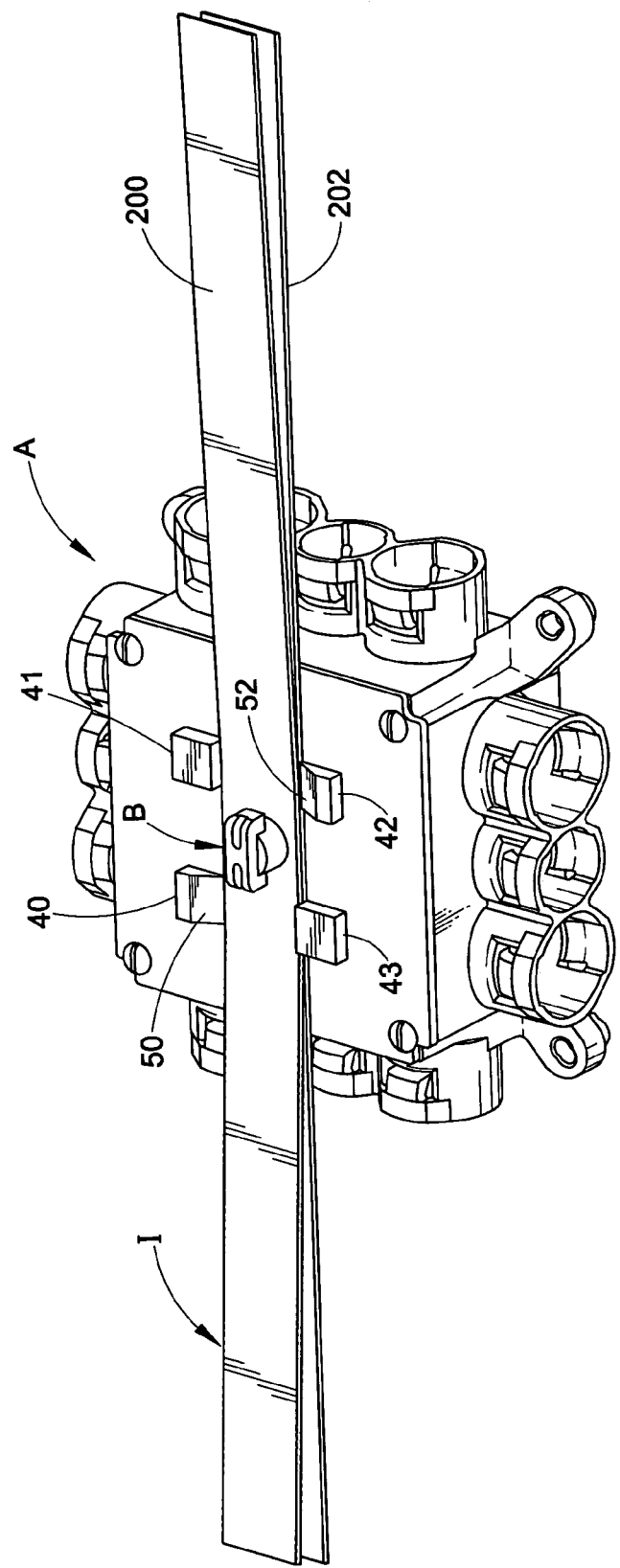
FIG. 20. is a perspective illustration of how the strap member is positioned for attaching same to a projection on the backwall of a mud box.
Figure 21:
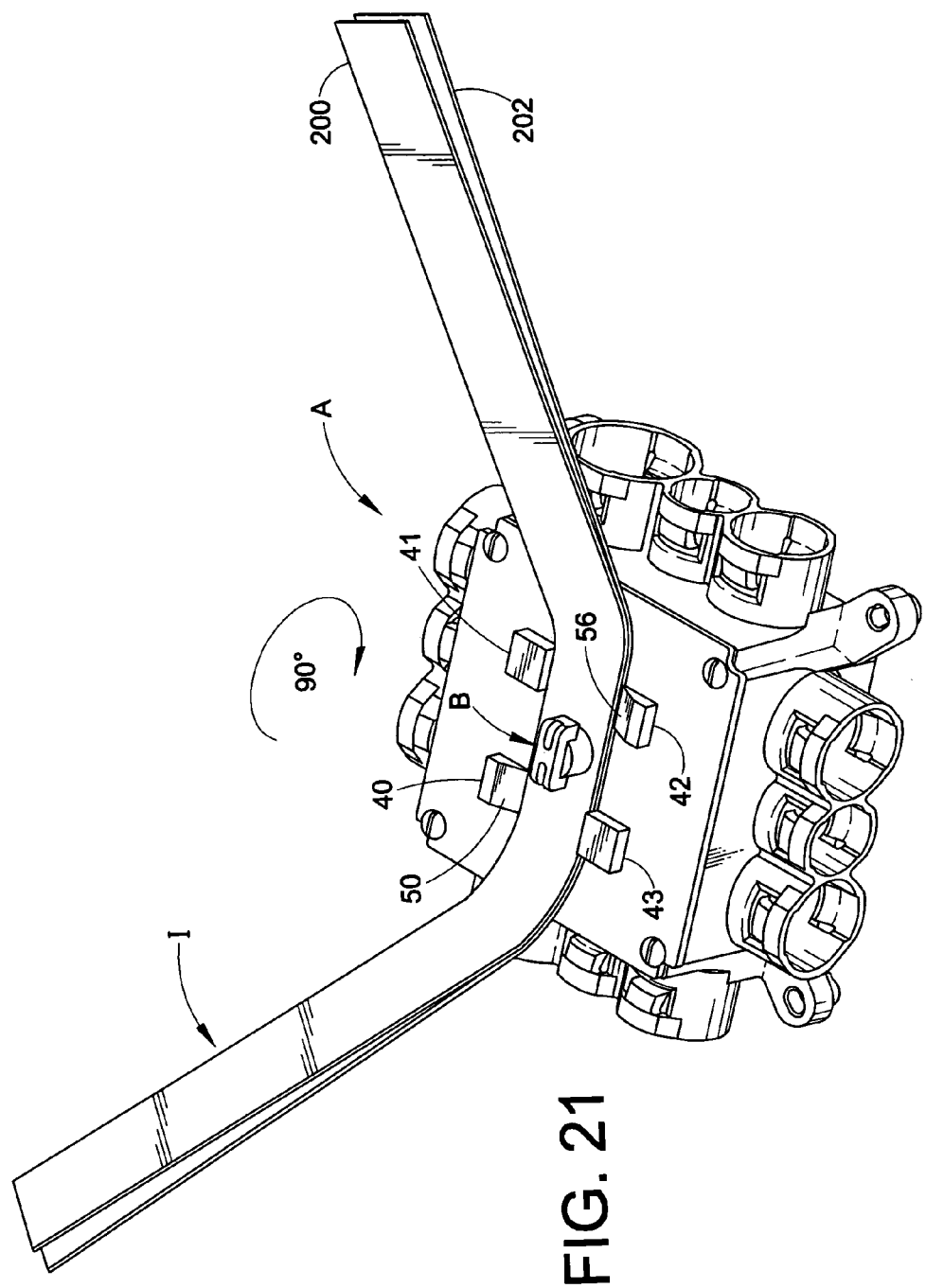
FIG. 21 is a perspective illustration showing an intermediate step in attaching the strap member to a mud box.
Figure 22:
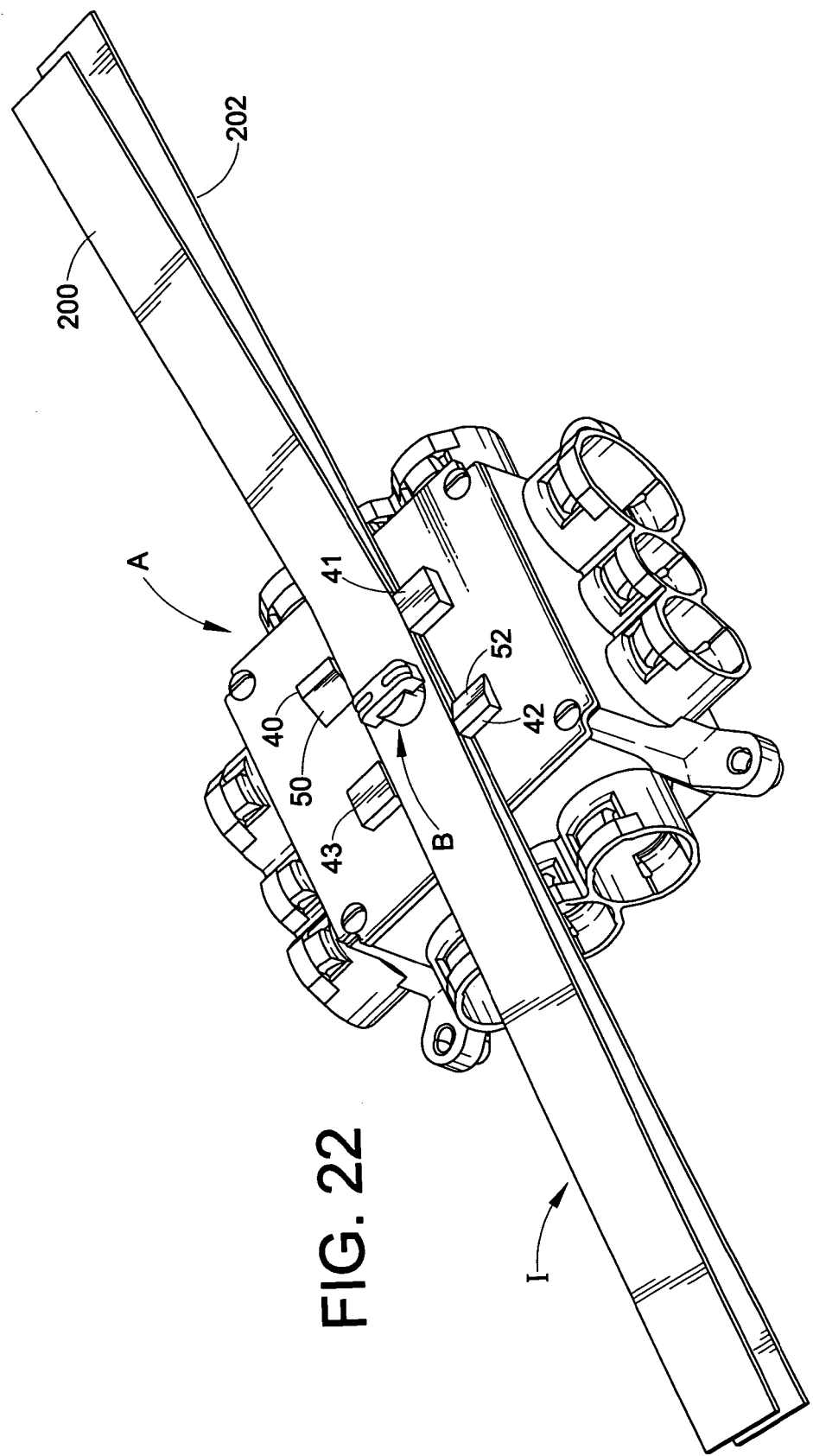
FIG. 22 is a perspective illustration showing the strap member attached to a mud box.

FIG. 20 shows strap member I positioned with projection B extending through opening H. In FIG. 21, the opposite end portions of strap member I are bent away from box A to a generally shallow U-shaped configuration and then rotated 90° so that the midportion of strap member I rides up cam surfaces 50, 52 and then snaps into the position shown in FIG. 22. The enlarged bead on projection B then extends perpendicular to the long dimension of opening H to lock strap member I to box A.

Figure 23:
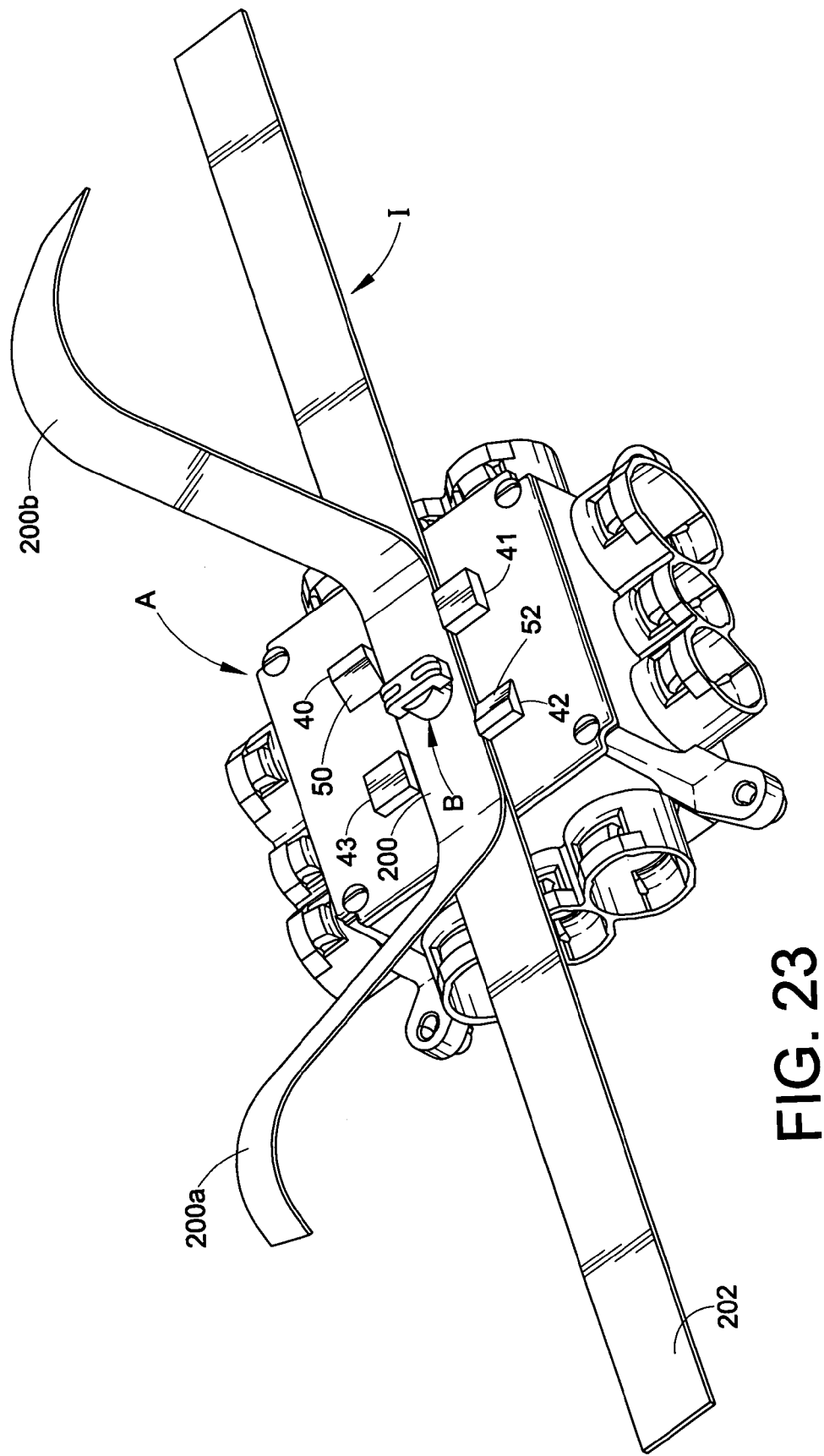
FIG. 23 is a perspective illustration showing the end portions of one strap bent into a box positioning configuration.

FIG. 23 is an example wherein strap 200 has its opposite end portions 200a, 200b bent away from box A and reversely curved.

Figure 24:
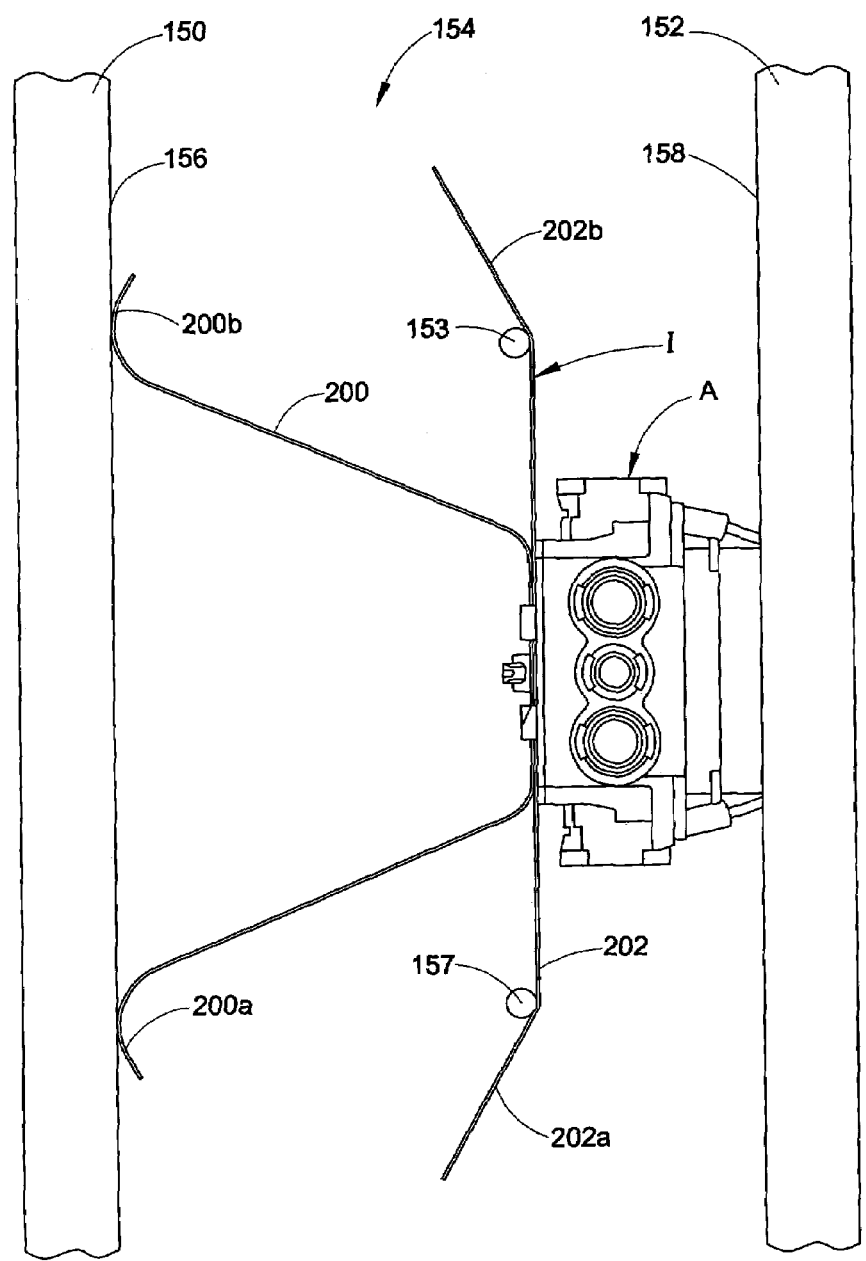
FIG. 24 is a side elevational view similar to FIG. 17, and showing the box and strap assembly of FIG. 23 positioned between a pair of parallel spaced-apart concrete forms.

FIG. 24 shows the reversely curved end portions 200a, 200b on strap 200 engaging an inner surface 156 of a concrete form 150 to locate the open end of box A or an adapter thereon in engagement with, or closely adjacent to, an inner surface 158 of concrete form 152. Strap 202 is shown with its end portions 202a, 202b in the process of being wrapped around reinforcing bars 153, 157. Strap 200 also may be wrapped around reinforcing bars instead of being bent to engage a concrete form surface.

The location of reinforcing bars sometimes makes it difficult to position spring legs E, E', and the multiple bendable strap arrangement provides an alternative box positioning and securing system.

Obviously, the strap arrangement may be provided in a variety of sizes. In one arrangement, strap member I has been made 23.75 inches long, and each strap 200, 202 approximately one inch wide. Strap member I has been stamped from 16 gauge type B galvanized sheet steel having a thickness of around 0.0635 inch.

When strap 200 is the outermost strap as shown, opening H in strap 202 can simply be circular as the special shape required for cooperation with projection B to lock the straps to the box is necessary for only one of the straps.

Although the invention has been shown and described with reference to a representative embodiment, it is obvious that alterations and modifications will occur to others skilled in the art upon the reading and understanding of this application. Therefore, it is to be understood that the invention may be practiced otherwise than as specifically described herein while remaining within the scope of the claims.

What is claimed is:

1. An electrical box for use in poured concrete construction of the type in which concrete is poured against a surface of a concrete form and metal reinforcing rods are positioned adjacent the form surface to be covered by concrete;
   the box being positionable adjacent the form surface to be at least partly embedded in the poured concrete;
   the box having a bottom wall with an external surface;
   a pair of elongated flat bendable metal straps that are selectively manually bendable into engagement with the form surface and the reinforcing rods to locate and maintain the box in a desired relationship to the form surface during pouring and curing of poured concrete; and,
   said external surface and said metal straps being configured for attachment of said straps to said bottom wall with said straps extending generally parallel to one another in overlying relationship so that one strap is positioned against said bottom wall and the other strap is positioned on the opposite side of said one strap from said bottom wall.

2. The box of claim 1 wherein said pair of straps are interconnected adjacent said box bottom wall.

3. The box of claim 2 wherein said straps in said pair of straps have opposite sides and are interconnected at one of said opposite sides.

4. The box of claim 2 wherein said pair of straps is of a single piece of metal that is folded 180° to locate said straps in overlying relationship.

5. The box of claim 1 wherein said straps have free end portions including curved free end portions.

6. An electrical box of plastic material, said box having a bottom wall with an external surface, a projection extending outwardly from said external surface, said projection having an enlarged head spaced outwardly from said external surface, a pair of elongated flat bendable metal straps having openings therethrough, said openings being configured for receiving said enlarged head therethrough, said enlarged head and at least one of said openings on at least one of said straps being configured to provide reception of said enlarged head through said one opening and to prevent withdrawal of said head from said opening after rotating said one strap about said projection, said straps being positioned in overlying parallel relationship, and said straps being interconnected adjacent to but spaced outwardly from said openings.

7. The box of claim 6 wherein said straps support said box between a pair of spaced-apart concrete forms that have inner form surfaces spaced-apart between 6-8 inches, said box having an open end and said straps supporting said box between said forms with said open end positioned closely adjacent to or in engagement with one of said form inner surfaces.

8. The box of claim 6 wherein said straps have free end portions including curved free end portions.

9. A mud box having an open end and a bottom wall opposite from said open end, said bottom wall having an external attachment projection, a plurality of abutments on said bottom wall spaced outwardly from said projection and forming abutment guideways therebetween, a plurality of bendable metal straps having attachment portions that are received in said abutment guideways and have attachment openings received over said attachment projection to attach said straps to said box, said straps having free end portions that are bendable and positionable to locate said box open end adjacent to or in engagement with a surface of a concrete form.

10. The box of claim 8 wherein at least two of said abutments have cam surfaces engageable by at least one of said attachment portions of said spring legs to cam said one attachment portion past said two abutments when said one attachment portion is placed over said projection and rotated 90°.

11. The box of claim 9 wherein said free end portions of said straps include curved free end portions.

12. Apparatus for positioning an electrical box relative to a surface of a concrete form used in poured concrete construction comprising:
   an elongated one piece strap member having a generally central opening therethrough for receiving a projection on an electrical box to attach the strap member to the box;
   said projection and opening being configured to provide reception of said projection through said opening in a first position of said strap member and to prevent withdrawal of said projection from said opening in a second rotated position of said strap member;
   said strap member including a plurality of flat bendable straps positioned in overlying parallel relationship with one strap positioned against the box and the other straps positioned on the opposite side of said one strap from the box;
   said plurality of flat bendable straps including at least four manually bendable strap end portions extending outwardly from the box on opposite sides thereof; and
   said straps being connected together adjacent said opening independently of the projection and opening attachment of the strap member to the box.

13. The apparatus of claim 12 wherein said strap member is a single piece of sheet metal.

14. The apparatus of claim 12 wherein said plurality of flat bendable straps comprise a pair of straps that are integrally connected along one side.

15. The apparatus of claim 14 wherein said pair of straps are connected at a pair of locations spaced from said opening.

16. The apparatus of claim 12 wherein said strap end portions include curved end portions.

17. In combination;
   an electrical box having a bottom wall;

a plurality of elongated flat bendable straps having opposite ends; and, said straps being attached to said bottom wall intermediate said opposite ends thereof with one of said straps positioned against said bottom wall and the other of said straps positioned on the opposite side of said one strap from said bottom wall so that said one strap is between said bottom wall and said other straps.

18. The combination of claim 17 wherein at least some of said plurality of straps extend generally perpendicular to one another.

19. The combination of claim 17 wherein at least some of said plurality of straps extend generally parallel to one another.

20. The combination of claim 17 wherein said plurality of straps comprises a pair of interconnected straps positioned in generally parallel overlying relationship.

21. The combination of claim 17 wherein said straps are attached to said bottom wall by way of at least one projection on said bottom wall that cooperates with said straps to hold same to said bottom wall without requiring the use of any additional fasteners.

22. The combination of claim 17 wherein said opposite ends of said straps include curved ends.

23. An electrical box having a bottom wall with an external surface, a plurality of elongated flat bendable metal straps, said external surface and said metal straps being configured for attachment of said straps to said bottom wall, said external surface having a projection thereon and said straps having openings through which said projection is receivable, said straps being positionable in overlying aligned inner and outer relationship for reception of said projection through said strap openings, and at least said outer strap being rotatable 90° to move said opening in said outer strap out of aligned relationship with said projection so that said projection no longer is movable through said opening in said outer strap to thereby hold said plurality of straps to said bottom wall.

24. The box of claim 23 wherein said straps have free end portions including curved free end portions.

25. An electrical box having a bottom wall with an external surface;

a plurality of elongated flat bendable metal straps having opposite flat surfaces and opposite end portions;

said external surface and said metal straps being configured for attachment of said straps to said bottom wall intermediate said strap opposite end portions without requiring the use of any additional fasteners by positioning said straps against said bottom wall and then rotating said straps about a rotational axis that extends generally perpendicular to said bottom wall;

said straps when attached to said bottom wall having facing flat surfaces in overlying engagement with one another at least intermediate said strap opposite end portions so that one strap is positioned against said bottom wall and the other straps are positioned on the opposite side of said one strap from said bottom wall.

26. An electrical box for use in poured concrete construction of the type in which concrete is poured in a space between inner surfaces of spaced-apart concrete forms, the space containing metal reinforcing rods to be covered by concrete;

the box being positioned adjacent one form inner surface to be at least partly embedded in the poured concrete;

the box having a bottom wall with an external surface;

at least two elongated flat manually bendable straps attached to the box bottom wall intermediate the opposite strap ends to provide at least four individually bendable strap end portions extending outwardly from the box;

the strap end portions being bendable in directions toward and away from the external surface of the box bottom wall and being bendable along their entire length for locating said box in a desired position relative to the concrete form; and, at least some of said strap end portions being wrapped around the metal reinforcing rods to attach the wrapped strap end portions to the rods without the use of wire ties or any other supplemental attachment device for selectively positioning the box adjacent the one form inner surface.

27. The box of claim 26 wherein other of said strap end portions are bent into engagement with the other form inner surface to locate the box adjacent the one form inner surface.

28. The box of claim 26 wherein the straps are positioned with one strap against the box bottom wall and the other straps on the opposite side of the one strap from the box bottom wall.

29. The box of claim 26 wherein said opposite end portions of said straps include curved end portions.

30. An electrical box for use in poured concrete construction of the type in which concrete is poured against a surface of a concrete form and metal reinforcing rods are positioned adjacent the form surface to be covered by concrete;

the box being positionable adjacent the form surface to be at least partly embedded in the poured concrete;

the box having a bottom wall with an external surface;

a pair of elongated flat bendable metal straps that are selectively manually bendable into engagement with the form surface and the reinforcing rods to locate and maintain the box in a desired relationship to the form surface during pouring and curing of poured concrete; and, said external surface and said metal straps being configured for attachment of said straps to said bottom wall with said straps extending generally parallel to one another in overlying relationship so that one strap is positioned against said bottom wall and the other strap is positioned on the opposite side of said one strap from said bottom wall;

wherein said pair of straps and said bottom wall are configured for attaching said straps to said bottom wall without the use of any additional fasteners by positioning said straps against said bottom wall and rotating same 90° about an axis that extends generally perpendicular to said bottom wall.

31. The box of claim 30 wherein said straps have free end portions including curved free end portions.

32. In combination;

an electrical box having a bottom wall;

a plurality of elongated flat bendable straps having opposite ends; and, said straps being attached to said bottom wall intermediate said opposite ends thereof with one of said straps positioned against said bottom wall and the other of said straps positioned on the opposite side of said one strap from said bottom wall so that said one strap is between said bottom wall and said other straps;

wherein said straps are attached to said bottom wall by way of at least one projection on said bottom wall that cooperates with said straps to hold same to said bottom wall without requiring the use of any additional fasteners; and wherein said straps have openings in which said projection is received and said straps are attached to said bottom wall by rotating said straps relative to said projection.

33. The combination of claim 32 wherein said opposite ends of said straps include curved ends.

* * * * *